US006228495B1

(12) United States Patent
Lupia et al.

(10) Patent No.: US 6,228,495 B1
(45) Date of Patent: May 8, 2001

(54) STABILIZED TELECOMMUNICATION CABLE INSULATION COMPOSITION

(75) Inventors: Joseph Lupia, Colfax, NC (US); Joseph Fay, Hopewell Junction, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/370,293

(22) Filed: Aug. 9, 1999

Related U.S. Application Data

(60) Provisional application No. 60/126,100, filed on Mar. 25, 1999.

(51) Int. Cl.[7] .......... B32B 15/00

(52) U.S. Cl. .......... 428/379; 428/375; 428/378; 174/23 C; 174/113 R; 174/110 PM; 174/110 SR

(58) Field of Search .......... 428/379, 375, 428/378; 174/110 SR, 110 PM, 23 C, 113 R

(56) References Cited

U.S. PATENT DOCUMENTS

| | | | |
|---|---|---|---|
| 3,660,438 | 5/1972 | Dexter | 260/404.5 |
| 3,773,722 | 11/1973 | Dexter | 260/45.75 |
| 3,888,709 | 6/1975 | Burk | 156/48 |
| 4,044,200 | 8/1977 | Turbett | 174/23 |
| 4,218,577 | 8/1980 | Bahder et al. | 174/23 |
| 4,233,470 | 11/1980 | Wight, Jr. | 174/120 |
| 4,812,500 | 3/1989 | Hayden | 524/99 |
| 5,380,591 | 1/1995 | Keogh et al. | 428/379 |
| 5,453,322 | 9/1995 | Keogh et al. | 428/379 |
| 5,474,847 | 12/1995 | Keogh et al. | 428/379 |
| 5,502,288 | 3/1996 | Cogen et al. | 174/113 |
| 5,575,952 | 11/1996 | Keogh et al. | 252/404 |
| 5,766,761 | 6/1998 | Cogen et al. | 428/379 |
| 5,807,635 | 9/1998 | Cogen et al. | 428/379 |

FOREIGN PATENT DOCUMENTS

| | | |
|---|---|---|
| 0002616 | 6/1979 | (EP) . |
| 0565868 | 10/1993 | (EP) . |
| 1439009 | 6/1976 | (GB) . |
| 93/24935 | 12/1993 | (WO) . |
| 93/24938 | 12/1993 | (WO) . |

OTHER PUBLICATIONS

Gächter et al., Plastics Additives Handbook, 3rd Edition, pp. 116–119, Undated.

*Primary Examiner*—William Krynski
*Assistant Examiner*—J. M. Gray
(74) *Attorney, Agent, or Firm*—Tyler A. Stevenson; Luther A. R. Hall

(57) ABSTRACT

Polyolefin wire insulation in hydrocarbon grease filled telecommunications cable which is subsequently exposed in an outdoor interconnection box is especially vulnerable to the adverse conditions of heat, oxygen and moisture. The combination of one or more primary phenolic antioxidants selected from N,N'-hexane-1,6-diylbis-(3-(3,5-di-tert-butyl-4-hydroxyphenylpropionamide)), tris(3,5-di-tert-butyl-4-hydroxybenzyl)isocyanurate and tris(2-(3,5-di-tert-butyl-4-hydroxyhydrocinnamoyloxy)ethyl)isocyanurate together with one or more alkylhydroxyphenylalkanoyl hydrazine metal deactivators is very effective towards providing oxidative stability for polyolefin wire insulation under these conditions.

8 Claims, No Drawings

STABILIZED TELECOMMUNICATION CABLE INSULATION COMPOSITION

This application claims the benefit under 35 USC 119(e) of U.S. Provisional Application Ser. No. 60/126,100, filed on Mar. 25, 1999.

The present invention pertains to a polyolefin composition for use as insulation for wire and cable that has improved resistance to the deleterious effects of heat, oxygen and moisture. The stabilized compositions are suitable for use as telecommunications (telecom) cable.

BACKGROUND OF THE INVENTION

A typical telecom cable is constructed of twisted pairs of polyolefin-insulated copper wire which are bundled together and protected by a cable sheath. The cable sheath is composed of a metal foil and/or armor in combination with a polymeric jacketing material. The entire system is referred to as "telecom cable".

To reduce the risk of water penetration into the cable system and to minimize the deleterious effects of moisture on the polyolefin insulation, the system is made water-tight by filling the voids in the cable with a hydrophobic grease. Cable systems of this type are described for example in U.S. Pat. Nos. 3,888,709, 4,044,200, 4,218,577, 5,502,288 and European patent application 565,868 A2, and the references therein. The cable filler grease is known to extract stabilizers incorporated into the wire insulation. This is discussed for example in "Plastics Additives Handbook", 3$^{rd}$ Edition, R. G äIchter, H. Müller, Eds., Hanser Publishers, pages 116–119 (1990)].

Junctions of two or more telecom cables are often required and this is accomplished in an outdoor enclosure known as a pedestal or an interconnection box. Inside the pedestal, the cable sheathing is removed, the cable filler grease is wiped off, and the transmission wires are joined as necessary. The exposed insulated wires are now subject to the adverse conditions of heat, oxygen and moisture. The polyolefin insulation, having lost a portion of its stabilizer additives to extraction by the filler grease, is especially vulnerable to these environmental conditions and may exhibit premature oxidative failure. This failure exhibits itself in the loss of physical properties of the insulation which ultimately results in a loss of electrical transmission performance.

The stabilization of polyolefin wire insulation in telecom applications with hindered phenolic antioxidants is known. A state of the art stabilizer system includes the use of a hindered phenol together with a metal deactivator such as IRGANOX® MD 1024, 1,2-bis(3,5-di-tert-butyl4-hydroxyhydrocinnamoyl)hydrazine or NAUGARD® XL-1, 2,2'-oxalyldiamido-bis-[ethyl 3-(3,5-di-tert-butyl4-hydroxylphenyl)propionate]. A typical stabilizer package includes, as the primary antioxidant, IRGANOX® 1010, pentaerythritol tetrakis [3-(3,5-di-tert-butyl-4-hydroxyphenyl)propionate], and as the metal deactivator, IRGANOX® MD 1024. This system is disclosed in European patent application 565,868 A2 and U.S. Pat. Nos. 4,044,200, 5,380,591 and 5,575,952. IRGANOX® is a protected trade name of Ciba Specialty Chemicals Corp., NAUGARD® is a protected trade name of Uniroyal.

U.S. Pat. No. 4,044,200 discloses the stabilization of polyethylene wire insulation in the presence of a moisture barrier filler with a combination of an alkylhydroxyphenylalkanoyl hydrazide and/or a substituted amido triazole together with a high molecular weight hindered phenolic antioxidant. Specifically disclosed is the combination of IRGANOX® MD 1024 and IRGANOX® 1010.

U.S. Pat. No. 4,812,500 discloses a polyolefin composition having improved resistance to deterioration when exposed to hot oxygenated water, chlorinated water, and Uv radiation. The composition comprises a hindered amine UV stabilizer, a hindered phenolic thermal stabilizer and a chelating (metal deactivating) agent. The hindered phenolic is selected from a specific group including IRGANOX® 1010, pentaerytiritol tetrakis [3-(3,5-di-tert-butyl4-hydroxyphenyl)propionate], and IRGANOX® 3114, tris(3, 5-di-tert-butyl-4-hydroxybenzyl)isocyanurate. The chelating agent is selected from a group including IRGANOX® MD 1024, 1,2-bis(3,5di-tert-butyl-4-hydroxyhydrocinnamoyl)hydrazine. IRGANOX® is a trademark of Ciba Specialty Chemicals Corp. It is contemplated that the invention may be used for various systems where water or moisture are present, including wire and cable coatings. There is no mention of grease filled cable systems where the potential for extraction of the additives exists.

U.S. Pat. Nos. 5,380,591, 5,453,322, 5,575,952, 5,766,761 and 5,807,635 disclose the stabilization of hydrocarbon grease filled telephone cables with the combination of a mixture of an alkylhydroxyphenylalkanoyl hydrazine with a functionalized hindered amine. IRGANOX® MD 1024 is specifically disclosed as the hydrazine in each case.

U.S. Pat. No. 5,474,847 teaches the stabilization of polyolefin wire insulation in grease filled telephone cables with the reaction products of hydrazide derivatives of hindered phenols or hindered amines or amino derivatives of hindered amines with a quinone.

U.S. Pat. No. 5,502,288 discloses the stabilization of polyolefin wire insulation in telephone cables with the use of IRGANOX® MD 1024 or NAUGARD® XL-1 or mixtures thereof with selected antioxidants.

European patent application 565,868 A2 teaches the stabilization of polyolefin wire insulation compositions exposed to water-blocking cable fillers with a combination of divalent metal salts of phenolic carboxylic or phosphonic acids together with a metal deactivator. Specifically named metal deactivators are IRGANOX® MD 1024 and NAUGARD® XL-1. A preferred composition also includes the use of IRGANOX® 1010.

WO 93/24935 teaches the use of the reaction products of an anhydride of an unsaturated aliphatic diacid with one or more functionalized hindered amines and/or functionaiized hindered phenols for the stabilization of polyolefin wire insulation in grease filled telephone cables.

WO 93/24938 discloses a grease filled cable construction in which the polyolefin wire insulation which has bonded to it, through an anhydride of an aliphatic diacid, one or more functionalized hindered amines and/or functionalized hindered phenols.

In order to protect the polyolefin wire insulation that is exposed to environmnental conditions in the interconnection box, and to counteract the extraction of stabilizers by the cable filler grease, it has been suggested that high loadings of the stabilizer system be employed. There is a need to find more efficient primary antioxidant/metal deactivator combinations than those that are the state of the art in order to reduce the high cost associated with the use of these levels of stabilizers. Stabilizer efficiency in this context is the combined ability of the stabilizer system to resist extraction from the polyolefin wire insulation into the cable filler grease and to provide the polyolefin with resistance to the deleterious effects of heat, oxygen and moisture.

Surprisingly, it has been found that the combination of one or more primary phenolic antioxidants selected from IRGANOX® 1098, N,N'-hexane-1,6-diylbis-(3-(3,5-di-tert-butyl-4-hydroxyphenylpropionamide)), IRGANOX® 3114, tris(3,5-di-tert-butyl-4-hydroxybenzyl)isocyanurate, and IRGANOX® 3125, tris(2-(3,5-di-tert-butyl-4-hydroxyhydrocinnamoyloxy)ethyl)isocyanurate, together with one or more alkylhydroxyphenylalkanoyl hydrazine metal deactivators is especially effective towards providing oxidative stability for polyolefin wire insulation in grease filled telecom cables. IRGANOX® is a trademark of Ciba Specialty Chemicals Corp.

DETAILED DESCRIPTION OF THE INVENTION

The present invention pertains to a novel hydrocarbon grease filled cable construction wherein the polyolefin wire insulation has improved oxidative stability.

More particularly, the novel cable construction of this invention comprises (i) a plurality of insulated electrical conductors having interstices therebetween,
 said insulation comprising
 (a) one or more polyolefins, and
 (b) one or more primary antioxidants selected from the group of N,N'-hexane-1,6-diylbis-(3-(3,5-di-tert-butyl-4-hydroxyphenylpropionamide)), tris(3,5-di-tert-butyl4-hydroxybenzyl)isocyanurate and tris(2-(3,5-di-tert-butyl-4-hydroxyhydrocinnanoyloxy) ethyl)isocyanurate, and
 (c) one or more metal deactivators selected from the alkylhydroxyphenylalkanoyl hydrazines, and (ii) hydrocarbon cable filler grease within the interstices, and (iii) a sheath surrounding components (i) and (ii).

The polyolefins of component (a) are generally thermoplastic resins, which are crosslinkable. They can be homopolymers or copolymers produced from two or more comonomers, or a blend of two or more of these polymers, conventionally used in film, sheet, and tubing, and as jacketing and/or insulating materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-I-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbomene, commonly the third monomer in a terpolymer; other monomers such as styrene, p-methyl styrene, alpha-methyl styrene, p-chlorostyrene, vinyl naphthalene, and similar aryl olefins; nitrites such a acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chorotrifluoroethylene; and acrylic acid, methacrylic acid, and other similar unsaturated acids.

The homopolymers and copolymers referred to can be non-halogenated, or halogenated in a conventional manner, generally with chorine or bromine. Examples of halogenated polymers are polyvinyl chloride, polyvinylidene chloride, and polytetrafluorothylene. The homopolymers and copolymers of ethylene and propylene are preferred, both in the non-halogenated and halogenated form. Included in this preferred group are terpolymers such as ethylene/propylene/diene monomer rubbers.

Other examples of ethylene polymers are as follows: a high pressure homopolymer of ethylene; a copolymer of ethylene and one or more alpha-olefins having 3 to 12 carbon atoms; a homopolymer or copolymer of ethylene having a hydrolyzable silane grafted to their backbones; a copolymer of ethylene and alkenyl trialkyloxy silane such as trimethoxy vinyl silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate/hydrolyzable silane terpolymer; and ethylene/ethyl acrylate or vinyl acetate copolymers having a hydrolyzable silane grafted to their backbones.

With respect to polypropylene: Homopolymers and copolymers of propylene and one or more other alpha-olefins wherein the portion of the copolymer based on propylene is at least about 60 percent by weight based on the weight of the copolymer can be used to provide the polyolefin of the invention. Preferred polypropylene alpha-olefin comonomers are those having 2 or 4 to 12 carbon atoms.

Polyolefins, i.e. the polymers of monoolefins exemplified above, for example polyethylene and polypropylene, can be prepared by different, and especially by the following, methods:

1) radical polymerization (normally under high pressure and at elevated temperature).

2) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

The homopolymer or copolymers can be crosslinked or cured with an organic peroxide, or to make them hydrolyzable, they can be grafted with alkenyl trialkoxy silane in the presence of an organic peroxide which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers can be moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates.

The homopolymers or copolymers of ethylene wherein ethylene is the primary comonomer and the homopolymers and copolymers of propylene wherein propylene is the primary comonomer may be referred to herein as polyethylene and polypropylene, respectively.

The alkylhydroxyphenylalkanoyl hydrazines of component (c) are described in U.S. Pat. Nos. 3,660,438 and 3,773,722. Preferably the compounds of component (c) are of the following structure:

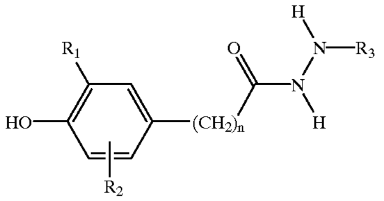

wherein n is 0 or an integer from 1 to 5;

$R_1$ is a straight or branched chain alkyl having 1 to 6 carbon atoms;

$R_2$ is hydrogen or $R_1$; and $R_3$ is hydrogen, an alkanoyl having 2 to 18 carbon atoms, or a group of the formula

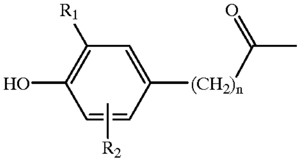

wherein n, $R_1$ and $R_2$ independently have the same definitions as above.

Preferably, the metal deactivator of component (c) is IRGANOX® MD 1024, 1,2-bis(3,5-di-tert-butyl-4-hydroxyhydrocinnamoyl)hydrazine, Ciba Specialty Chemicals Corp.

The hydrocarbon cable filler grease of component (ii) is a mixture of hydrocarbon compounds, which is semisolid at use temperatures. It is known industrially as "cable filling compound." A typical requirement of cable filling compounds is that the grease has minimal leakage from the cut end of a cable at a 60° C. or higher temperature rating. Another typical requirement is that the grease resist water leakage through a short length of cut cable when water pressure is applied at one end. Among other typical requirements are cost competitiveness; minimal detrimental effect on signal transmission; minimal detrimental effect on the physical characteristics of the polymeric insulation and cable sheathing materials; thermal and oxidative stability; and cable fabrication processability.

Cable fabrication can be accomplished by heating the cable filling compound to a temperature of approximately 100° C. This liquefies the filling compound so that it can be pumped into the multiconductor cable core to fully impregnate the interstices and eliminate all air space. Alternatively, thixotropic cable filling compounds using shear induced flow can be processed at reduced temperatures in the same manner. A cross section of a typical finished grease filled cable transmission core is made up of about 52 percent insulated wire and about 48 percent interstices in terms of the areas of the total cross section. Since the interstices are completely filled with cable filling compound, a filled cable core typically contains about 48 percent by volume of cable filling compound.

The cable filling compound or one or more of its hydrocarbon constituents enter the insulation through absorption from the interstices. Generally, the insulation absorbs about 3 to about 30 weight percent cable filling compound or one or more of its hydrocarbon constituents, in total, based on the weight of polyolefin insulation. A typical absorption is in the range of about 5 to about 25 weight percent based on the weight of polyolefin. Cable filling compound generally contains hydrocarbons of varying molecular weights. The absorption of cable filling compound into the polyolefin insulation, or swelling, is preferential for the lower molecular weight constituents of the cable filling compound. This swelling of the polyolefin insulation results in migration of additives from the insulation to the cable filler compound as discussed supra. The presence of the cable filling compound therefore presents an additional obstacle towards stabilizing polyolefin insulation.

Examples of hydrocarbon cable filler grease (cable filling compound) are petrolatum; petrolatum/polyolefin wax mixtures; oil modified thermoplastic rubber (ETPR or extended thermoplastic rubber); paraffin oil; naphthenic oil; mineral oil; the aforementioned oils thickened with a residual oil, petrolatum, or wax; polyethylene wax; mineral oil/rubber block copolymer mixture; lubricating grease; and various mixtures thereof, all of which meet industrial requirements similar to those described above.

In addition to resisting extraction of the antioxidants, the stabilized polyolefin wire insulation formulation must be able to withstand any destabilizing effect absorbed constituents from the cable filler compound might have. Further, the stabilization package must mediate against the copper wire conductor, which is a potential catalyst for polyolefin oxidative degradation, and it must also counter the effect of residuals of chemical blowing agents present in cellular and cellular/solid (foam/skin) polymeric foamed insulation.

In addition to components (b) and (c), the insulation of the cable construction of this invention may comprise fier costabilizers (additives) such as for example, the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl4-methoxyphenol, 2,5-di-tert-butylhydroquinone, 2,5-di-tert-amylhydroquinone, 2,6-diphenyl4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl4-hydroxyphenyl stearate, bis-(3,5-di-tert-butyl4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2 -methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl4-hydroxy-5-methyl-phenyl) dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl4-hydroxyphenyl)propane, 2,2-bis-(5-tert-butyl-4-hydroxy2-methylphenyl)-4-n-dodecylmercaptobutane, 1,1,5,5-tetra-(5-tert-butyl4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl4-hydroxybenzyl)sulfide, isooctyl-3,5-di-tert-butyl4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl4-hydroxybenzyl)malonate, bis[4-(1,1,3,3-tetramethylbutyl)phenyl]-2,2-bis(3,5-di-tert-butyl4-hydroxybenzyl)malonate.

1.9. Aromatic hydroxybenzyl compounds, for example 1,3,5-tris-(3,5-di-tert-butyl4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6 -tris(3,5-di-tert-butyl-4-hydroxyphenylethyl)-1,3,5-triazine, 1,3,5-tris(3,5-di-tert-butyl4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl4-hydroxybenzylphosphonate, diethyl-3,5-di-tert-butyl4-hydroxybenzylphosphonate, dioctadecyl3,5-di-tert-butyl4-hydroxybenzylphosphonate, dioctadecyl-5-tert-butyl-4-hydroxy-3-methylbenzylphosphonate, the calcium salt of the monoethyl ester of 3,5-di-tert-butyl4-hydroxybenzylphosphonic acid.

1.12. Acylaminophenols, for example 4-hydroxylauranilide, 4-hydroxystearanilide, octyl N-(3,5-di-tert-butyl4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl4-hydroxyphenyl]propionyloxy)ethyl]oxamide (NAUGARD® XL-1 supplied by Uniroyal).

1.18. Ascorbic acid (vitamin C).

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tertoctylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene, N,N-bis-(2,2,6,6-tetramethyl-piperid4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)benzotriazoles, for example 2-(2-hydroxy-5-methylphenyl)benzotriazole, 2-(3,5-di-tert-butyl-2-hydroxyphenyl)benzotriazole, 2-(5-tert-butyl-2-hydroxyphenyl)benzotriazole, 2-(2-hydroxy-5-(1,1,3,3-tetramethylbutyl)phenyl)benzotriazole, 2-(3,5-di-tert-butyl-2-hydroxyphenyl)-5-chloro-benzotriazole, 2-(3-tert-butyl-2-hydroxy-5-methylphenyl)-5-chloro-benzotriazole, 2-(3-sec-butyl-5-tert-butyl-2-hydroxyphenyl)benzotriazole, 2-(2-hydroxy4-octyloxyphenyl)benzotriazole, 2-(3,5-di-tert-amyl-2-hydroxyphenyl)benzotriazole, 2-(3,5-bis-(α,α-dimethylbenzyl)-2-hydroxyphenyl)benzotriazole, 2-(3-tert-butyl-2-hydroxy-5-(2-octyloxycarbonylethyl)phenyl)-5-chloro-benzotriazole, 2-(3-tert-butyl-5-[2-(2-ethylhexyloxy)-carbonylethyl]-2-hydroxyphenyl)-5-chloro-benzotriazole, 2-(3-tert-butyl-2-hydroxy-5-(2-methoxycarbonylethyl)phenyl)-5-chloro-benzotriazole, 2-(3-tert-butyl-2-hydroxy-5-(2-methoxycarbonylethyl)phenyl)benzotriazole, 2-(3-tert-butyl-2-hydroxy-5-(2-octyloxycarbonylethyl)phenyl)benzotriazole, 2-(3-tert-butyl-5-[2-(2-ethylhexyloxy)carbonylethyl]-2-hydroxyphenyl)benzotriazole, 2-(3-dodecyl-2-hydroxy-5-methylphenyl)benzotriazole, 2-(3-tert-butyl-2-hydroxy-5-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3-tert-butyl-5-(2-methoxycarbonylethyl)-2-hydroxyphenyl]-2H-benzotriazole with polyethylene glycol 300;

$$[R—CH_2CH_2—COO—CH_2CH_2\sqrt[3]{}\;_2$$

where R=3'-tert-butyl-4'-hydroxy-5'-2H-benzotriazol-2-ylphenyl, 2-[2-hydroxy-3-(α,α-dimethylbenzyl)-5-(1,1,3,3-tetramethylbutyl)phenyl]-benzotriazole; 2-[2-hydroxy-3-(1,1,3,3-tetramethylbutyl)-5-(a,a-dimethylbenzyl)-phenyl]-benzotriazole.

2.2.2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis(4-tertbutylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl a-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triehanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane and epichorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl4aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethyl-aminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy4-octyloxyphenyl)-4,6-bis(2,4-dimethylphenyl)-1,3,5-triaziine, 2-(2,4-dihydroxyphenyl)-4,6-bis(2,4-dimethylphenyl)- 1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]- 1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxylphenyl}-4,6-bis(2,4-dimethylphenyl)-1,3,5-triazine, 4,6-bis(2,4-dimethylphenyl)-2-[2-hydroxy-4-(2-hydroxy-3-nonyloxypropoxy)-5-(1-methyl-1-phenylethyl)phenyl]-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2]dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl)phosphite (IRGAFOS® 168, Ciba Specialty Chemicals Corp.), tris(nonylphenyl) phosphite, (A)

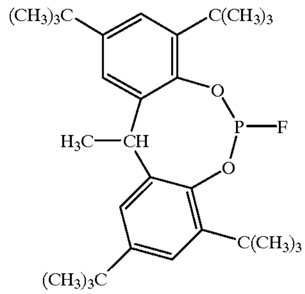

(B)

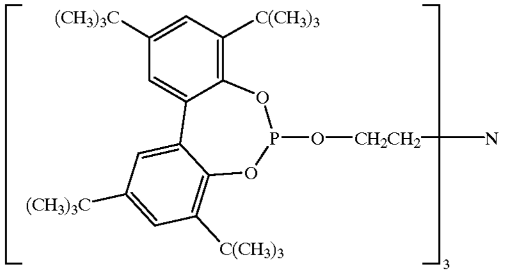

(C)

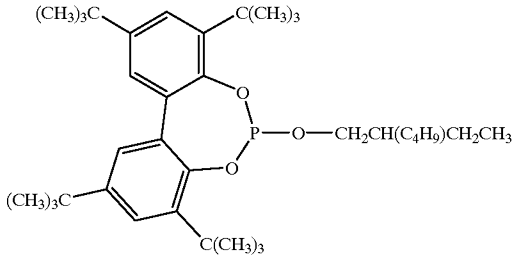

(D)

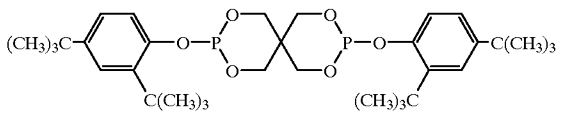

(E)

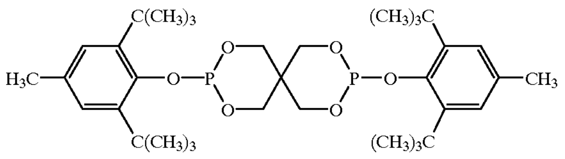

(F)

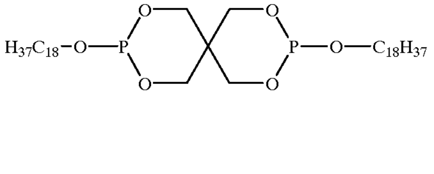

-continued (G)

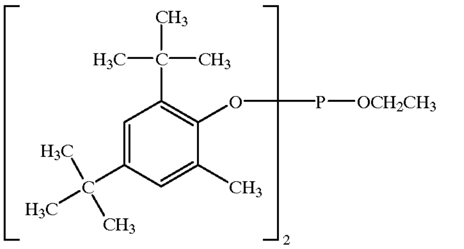

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyl-amine, N-heptadecyl-N-octadecylhydroxylamine, N,N-dialkylhydroxylamine derived from hydrogenated tallow amine, N,N-di(alkyl) hydroxylamine produced by the direct oxidation of N,N-di (hydrogenated tallow)amine.

6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

8. Thiosynergists, for example dilauryl thiodipropionate or distearyl thiodipropionate.

9. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

10. Polyamide stabilizers, for example copper salts in combination with iodides and/or phosphorus compounds and salts of divalent manganese.

11. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

12. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

13. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

14. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiing agents and blowing agents.

The fillers (item 13. in the list) are for example metal hydroxides, especially magnesium hydroxide and aluminum hydroxide. They may be added in a concentration of about 0.01 to about 60 weight percent based on the weight of polyolefin.

Blowing agents (item 14. in the list), such as azodicarbonamide, can be used to provide foam rather than solid insulation.

The primary antioxidants of component (b), the metal deactivators of component (c) and optional further additives are incorporated into the polyolefin of component (a) by known methods, for example before or after molding or also by applying the dissolved or dispersed stabilizer mixture to the polyolefin, with or without subsequent evaporation of the solvent. Components (b) and (c) and optional further additives can also be added to the polyolefin in the form of a masterbatch which contains these components in a concentration of, for example, about 2.5 percent to about 25 percent by weight.

The antioxidants of component (b), in total, are employed in the range of about 0.01 weight percent to about 1.5 weight percent based on the weight of the polyolefin (a). Preferably, the compounds of component (b), in total, are employed in the range from about 0.05 weight percent to about 1.0 weight percent based on the weight of the polyolefin (a).

The metal deactivators of component (c), in total, are employed in the range of about 0.1 weight percent to about 2.5 weight percent based on the weight of the polyolefin (a). Preferably, the compounds of component (c), in total, are employed in the range from about 0.1 weight percent to about 2.0 weight percent based on the weight of the polyolefin (a).

The ratio of the metal deactivators of component (c) to the antioxidants of component (b) employed in the instant invention is in the range of from about 0.5:1 to about 20:1. Preferably the ratio of component (c) to component (b) is in the range of from about 1:1 to about 10:1.

The following Examples illustrate the invention in more detail. They are not meant to be construed as limiting the invention in any manner whatsoever.

EXAMPLE 1

Stabilization of Polyolefins in Grease Filled Cable Construction 100 parts high density polyethylene are dry blended with 0.4 parts of IRGANOX® MD 1024 (1,2-bis(3,5-di-tert-butyl4-hydroxyhydrocinnamoyl)hydrazine) and 0.2 parts of one of the primary antioxidants listed in Table 1 below. The mixtures are melt compounded into pellets at 230° C. in a Superior/MPM extruder using a 24:1 L/D screw with Maddock mixing head at 60 rpm.

The pelletized polyethylene containing the stabilizer mixtures are compression molded at 400° F. into 10 mil (0.01 inch) thick films with Mylar backing. "Initial oxidation induction time" (OIT) is measured on these test films.

The sample films are then submersed in WITCOGEL®, available from Witco, a typical hydrocarbon cable filler grease used in telecom cables. The Witco filling compound contains 0.6% IRGANOX® 1035, thiodiethylene bis[3-(3,5-di-tert-butyl-4-hydroxyphenyl)propionate]. The sample films submersed in the filling compound are exposed in an air oven at 70° C. for 14 days. The samples are then wiped clean of the cable filler grease. "Aged oxidation induction time" is measured on these samples.

OIT testing is accomplished using a differential scanning calorimeter as per ASTM standard test method D3895. The test conditions are: Uncrimped aluminum pan; no screen; heat up to 200° C. under nitrogen, followed by a switch to a 100 milliliter/minute flow of oxygen. Oxidation induction time (OIT) is the time interval between the start of oxygen flow and the exothennic decomposition of the test specimen. OIT is reported in minutes; the longer the OIT the more effective the stabilizer mixture is at preventing oxidative degradation. Relative performance of stabilizer mixtures in grease filled cable applications can be predicted by comparing the initial OIT values, the aged OIT values and the differences between the initial OIT and aged OIT values.

TABLE 1

| Primary Antioxidant | Initial OIT (minutes) | Aged OIT (minutes) |
|---|---|---|
| IRGANOX ® 1010 | 77 | 25 |
| IRGANOX ® 1098 | 161 | 90 |
| IRGANOX ® 3114 | 91 | 44 |
| IRGANOX ® 3125 | 126 | 51 |

The stabilizer mixtures of IRGANOX® 1098, IRGANOX® 3114, IRGANOX® 3125, each with the metal deactivator IRGANOX® MD 1024 (1,2-bis(3,5-di-tert-butyl-4-hydroxyhydrocinnamoyl)hydrazine) outperform a state of the art stabilizer mixture of IRGANOX® 1010/IRGANOX® MD 1024 in initial and aged OIT. IRGANOX® 1098 is N,N'-hexane-1,6-diylbis-(3-(3,5-di-tert-butyl-4-hydroxyphenylpropionamide)), IRGANOX® 3114 is tris(3,5-di-tert-butyl-4-hydroxybenzyl)isocyanurate, IRGANOX® 3125 is tris(2-(3,5-di-tert-butyl-4-hydroxyhydrocinnamoyloxy)ethyl)isocyanurate. IRGANOX® is a trademark of Ciba Specialty Chemicals Corporation.

What is claimed is:

1. A stabilized cable construction, which comprises (i) a plurality of insulated electrical conductors having interstices therebetween, said insulation comprising (a) one or more polyolefins, and (b) one or more primary antioxidants selected from the group of N,N'-hexane-1,6-diylbis-(3-(3,5-di-tert-butyl-4-hydroxyphenylpropionamide)), tris(3,5-di-tert-butyl-4-hydroxybenzyl)isocyanurate and tris(2-(3,5-di-tert-butyl-4-hydroxyhydrocinnamoyloxy)ethyl)isocyanurate, and (c) one or more metal deactivators selected from the alkylhydroxyphenylalkanoyl hydrazines, and (ii) hydrocarbon cable filler grease within the interstices, and (iii) a sheath surrounding components (i) and (ii).

2. A cable construction according to claim 1 wherein said polyolefins of component (a) are polyethylene or polypropylene or mixtures thereof.

3. A cable construction according to claim 1 in which the metal deactivators of component (c) are of the formula

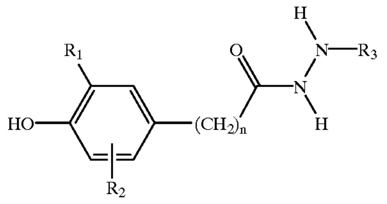

wherein n is 0 or an integer from 1 to 5;

$R_1$ is a straight or branched chain alkyl having 1 to 6 carbon atoms;

$R_2$ is hydrogen or $R_1$; and $R_3$ is hydrogen, an alkanoyl having 2 to 18 carbon atoms, or a group of the formula

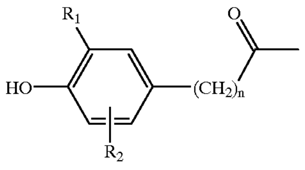

wherein n, $R_1$ and $R_2$ independently have the same definitions as above.

4. A cable construction according to claim 1 in which the metal deactivator of component (c) is 1,2-bis(3,5-di-tert-butyl-4-hydroxyhydrocinnamoyl)hydrazine.

5. A cable construction according to claim 1 in which said antioxidants of component (b), in total, are present in the range from about 0.05 weight percent to about 1.0 weight percent based on the weight of the polyolefin of component (a).

6. A cable construction according to claim 1 in which said metal deactivators of component (c), in total, are present in the range from about 0.1 weight percent to about 2.0 weight percent based on the weight of the polyolefin of component (a).

7. A cable construction according to claim 1 in which the hydrocarbon cable filler grease of component (ii) or one or more of the hydrocarbon constituents thereof is present in the polyolefin of component (a).

8. A cable construction according to claim 1 in which the hydrocarbon cable filler grease of component (ii) or one or more of the hydrocarbon constituents thereof, in total, is present in the polyolefin of component (a) in the range of about 3 to about 30 weight percent based on the weight of component (a).

* * * * *